(12) United States Patent
Rami et al.

(10) Patent No.: US 10,634,059 B2
(45) Date of Patent: Apr. 28, 2020

(54) ACOUSTIC ATTENUATION PANEL FOR A TURBOJET ENGINE NACELLE

(71) Applicant: SAFRAN NACELLES, Gonfreville l'Orcher (FR)

(72) Inventors: Jean-Paul Rami, Gonfreville l'Orcher (FR); Jérôme Corfa, Gonfreville l'Orcher (FR); Marc Versaevel, Gonfreville l'Orcher (FR); François Brefort, Gonfreville l'Orcher (FR); Remko Moeys, Besozzo (IT)

(73) Assignee: SAFRAN NACELLES, Gonfreville l'Orcher (FR)

( * ) Notice: Subject to any disclaimer, the term of this patent is extended or adjusted under 35 U.S.C. 154(b) by 254 days.

(21) Appl. No.: 15/630,223

(22) Filed: Jun. 22, 2017

(65) Prior Publication Data
US 2017/0292453 A1   Oct. 12, 2017

Related U.S. Application Data

(63) Continuation of application No. PCT/FR2015/053730, filed on Dec. 22, 2015.

(30) Foreign Application Priority Data

Dec. 24, 2014 (FR) ..................... 14 63317

(51) Int. Cl.
| | |
|---|---|
| *F02C 7/24* | (2006.01) |
| *F02K 1/82* | (2006.01) |
| *F02C 7/045* | (2006.01) |
| *F04D 29/66* | (2006.01) |
| *G10K 11/172* | (2006.01) |

(Continued)

(52) U.S. Cl.
CPC ............... *F02C 7/24* (2013.01); *B64D 33/02* (2013.01); *B64D 33/06* (2013.01); *F02C 7/045* (2013.01); *F02K 1/827* (2013.01); *F04D 29/665* (2013.01); *G10K 11/172* (2013.01); *B64D 29/00* (2013.01); *B64D 2033/0206* (2013.01); *F05D 2220/323* (2013.01); *F05D 2250/191* (2013.01);

(Continued)

(58) Field of Classification Search
CPC . B64D 33/06; B64D 2033/0206; F02C 7/045; F02C 7/24; F02K 1/827; F04D 29/665
USPC ........................................................ 181/292
See application file for complete search history.

(56) References Cited

U.S. PATENT DOCUMENTS

2015/0292413 A1* 10/2015 Soria ................... F02K 1/827
                                                              181/290

FOREIGN PATENT DOCUMENTS

| EP | 2292967 | 3/2011 |
|---|---|---|
| FR | 2214932 | 8/1974 |

(Continued)

OTHER PUBLICATIONS

International Search Report for International Application PCT/FR2015/053730, dated Mar. 22, 2016.

*Primary Examiner* — Nicholas McFall
(74) *Attorney, Agent, or Firm* — Burris Law, PLLC

(57) ABSTRACT

An acoustic attenuation panel for a turbojet engine nacelle is provided by the present disclosure. The panel includes at least one alveolar core disposed between at least one internal skin and at least one external skin. In one form, the alveolar core includes a plurality of alveoli having a helical-shaped cavity along an axis in a direction normal to at least one internal skin and at least one external skin.

10 Claims, 4 Drawing Sheets

(51) Int. Cl.
*B64D 33/02* (2006.01)
*F02K 1/34* (2006.01)
*B64D 29/00* (2006.01)

(52) U.S. Cl.
CPC .... *F05D 2250/25* (2013.01); *F05D 2250/283* (2013.01); *Y02T 50/672* (2013.01)

(56) References Cited

FOREIGN PATENT DOCUMENTS

| WO | WO1992012854 | 8/1992 |
|----|--------------|--------|
| WO | WO2011034469 | 3/2011 |
| WO | WO2011144842 | 11/2011 |

* cited by examiner

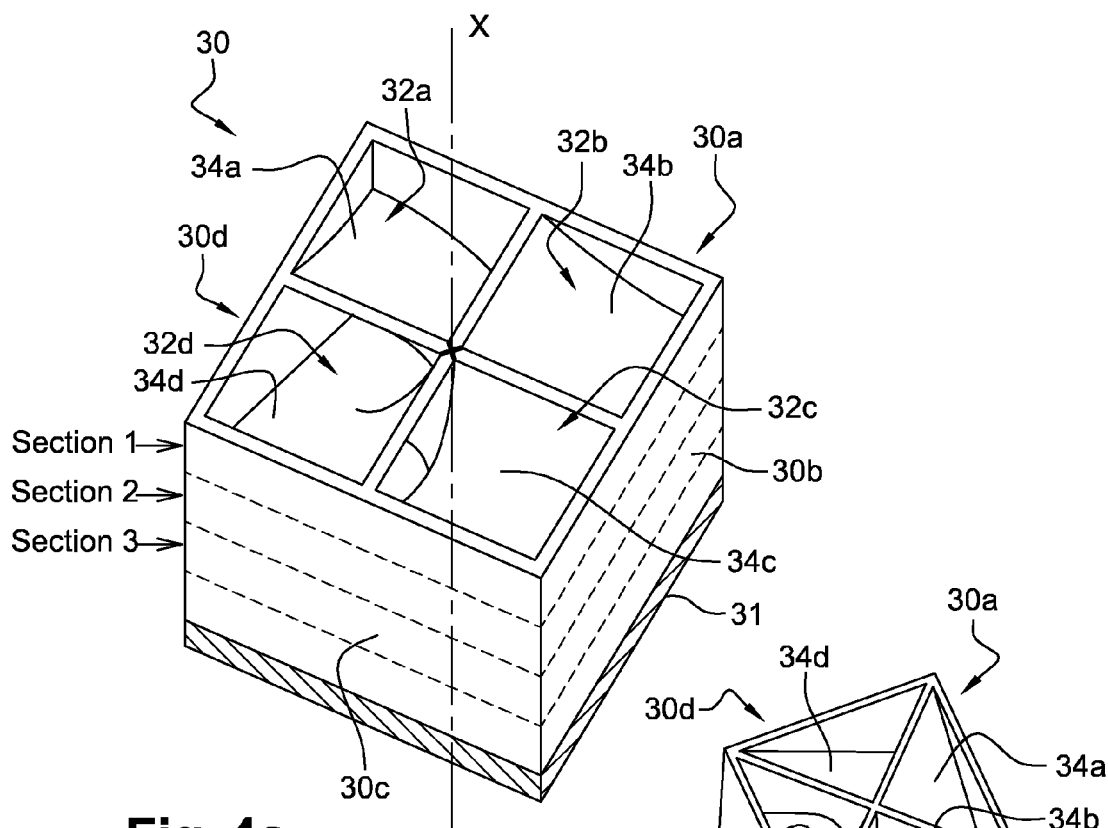
Fig. 4a
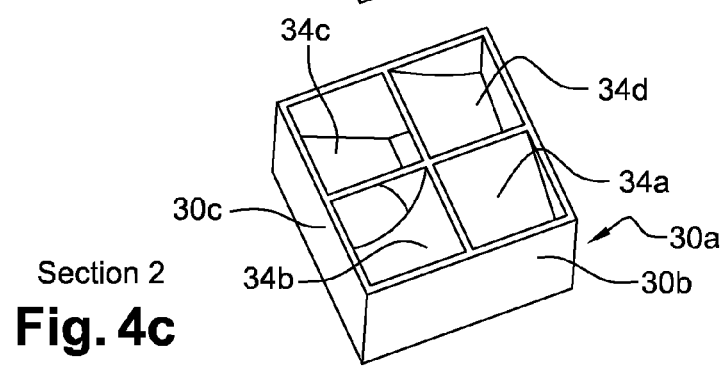
Section 1
Fig. 4b
Fig. 4c
Section 2
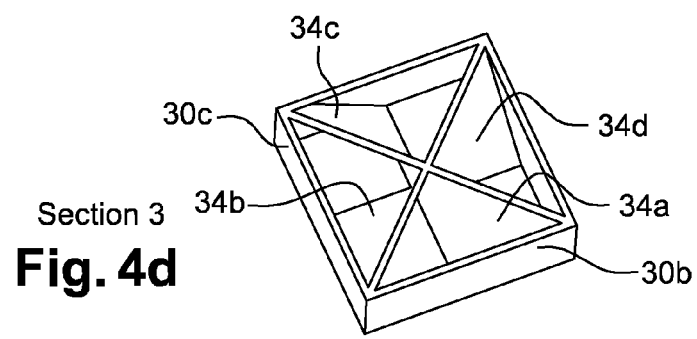
Section 3
Fig. 4d

ACOUSTIC ATTENUATION PANEL FOR A TURBOJET ENGINE NACELLE

CROSS-REFERENCE TO RELATED APPLICATIONS

This application is a continuation of International Application No. PCT/FR2015/053730, filed on Dec. 22, 2015, which claims priority to and the benefit of FR 14/63317 filed on Dec. 24, 2014. The disclosures of the above applications are incorporated herein by reference.

FIELD

The present disclosure relates to the field of acoustic absorption in the nacelles of turbojet engines of aircraft.

BACKGROUND

The statements in this section merely provide background information related to the present disclosure and may not constitute prior art.

The sound emissions generated by the turbojet engines of an aircraft are particularly intense at the time of take-off, while the aircraft is generally in the vicinity of inhabited areas.

Numerous research relating to the way to reduce the sound emissions generated by the turbojet engines of aircraft has been conducted in recent years.

This research led, in particular, to the setting up of acoustic absorption panels in the nacelle surrounding the turbojet engine, in particular in the areas where the sound emissions are the most important.

These panels generally operate according to the principle of the Helmholtz resonators, and for this purpose comprise a set of cavities sandwiched between, on the one hand, a solid skin and, and on the other hand, a perforated skin.

The perforated skin is facing the noise emission area, so that the acoustic waves can penetrate through the openings of the perforated skin inside the cavities. The acoustic energy is dissipated by the visco-thermal effect in the cavities. The height of the cavities allows opting for the target frequency band.

Besides their acoustic attenuation function, these panels provide two other functions:

an aerodynamic function: the perforated skin being in contact with the air and gas flows circulating through the turbojet engine and the nacelle, the perforated skin channels the flow and disturb the least possible these flows;

a force absorption function: by means of the sandwich, the acoustic attenuation panel is capable of taking some of the forces undergone by the nacelle.

One of the disadvantages of such panels is that they have a large thickness, which makes their integration difficult in nacelles with increasingly thin lines.

This difficulty is increased for the nacelles adapted to turbojet engines with a high bypass ratio, in which the acoustic frequencies to be absorbed are lower, thus involving even thicker absorption panels. Indeed, the range of attenuation frequencies is directly related to the height of the cavities: the higher this height is, the more the attenuation peak shifts towards the low frequencies.

The improvement of the acoustic attenuation panels thus aims to increase the length of the cavities in order to effectively attenuate the low frequencies, without increasing the total thickness of the panel by reducing the perforated surface of the acoustic skin, while preserving the structural properties of the panel.

In order to increase the length of the acoustic cavities, it is known from document WO 92/12854 to propose an acoustic panel including an alveolar core whose cavities are inclined relative to the direction normal to the skins of the panel. However, this solution has the disadvantage of greatly reducing the mechanical strength of the panel, in particular its strength to the compression forces.

Moreover, it is known from document WO 2011/034469 a solution consisting in gathering several alveoli communicating with each other. A single alveolus per group communicates with the outside of the panel, so that the path traveled by the sound waves is a function of the number of communicating alveoli. However, this solution has the disadvantage of reducing the number of perforations, which reduces the acoustically processed surface.

SUMMARY

The present disclosure provides an acoustic attenuation panel for a turbojet engine nacelle, including at least one alveolar core disposed between at least one inner skin and at least one outer skin. The alveolar core includes a plurality of alveoli, wherein each alveolus defines a generally helical-shaped cavity winding along an axis of a direction normal to the inner and outer skins.

Thus, by providing generally helical-shaped cavities, the length of these cavities is increased for the same thickness of the panel. The acoustic processing in the low frequencies is improved without increasing the thickness of the panel.

In one form of the present disclosure, the alveolar core includes a plurality of cells, each cell including a plurality of alveoli, the outer walls of the cells extending along a direction parallel to the direction of the winding axis of the helical profile of the alveoli. In this configuration, the vertical walls of each cell are structuring and provide the mechanical strength of the panel, in particular the strength to the compression forces.

In one variation, each cell includes four alveoli.

In another variation, each cell has a square section.

In yet another variation, each cell includes four webs having a helical profile winding about a common axis of a direction normal to the inner and outer skins, the adjacent webs delimiting, in pairs, with the outer walls of the cell, one of the alveoli.

In another form, each web forms a helicoid winding about the common axis, the edges of each helicoid being interrupted by the outer walls of the cell.

In yet another form, the panel includes a two-level alveolar core, at least one of the levels including cylindrical-shaped cavities extending along a direction normal to the inner and outer skins.

In still another form, the outer skin is a perforated skin, called an acoustic skin.

In other forms, the inner skin is a solid skin, called support skin.

The present disclosure also concerns a nacelle for an aircraft turbojet engine, said nacelle comprising at least one panel as defined above.

The present disclosure also relates to a nacelle for an aircraft turbojet engine, comprising at least one panel in accordance with the foregoing.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which:

FIGS. 4a through 4d show detailed views of one form of acoustic cavities in accordance with the teachings of the present disclosure.

Figure 1:
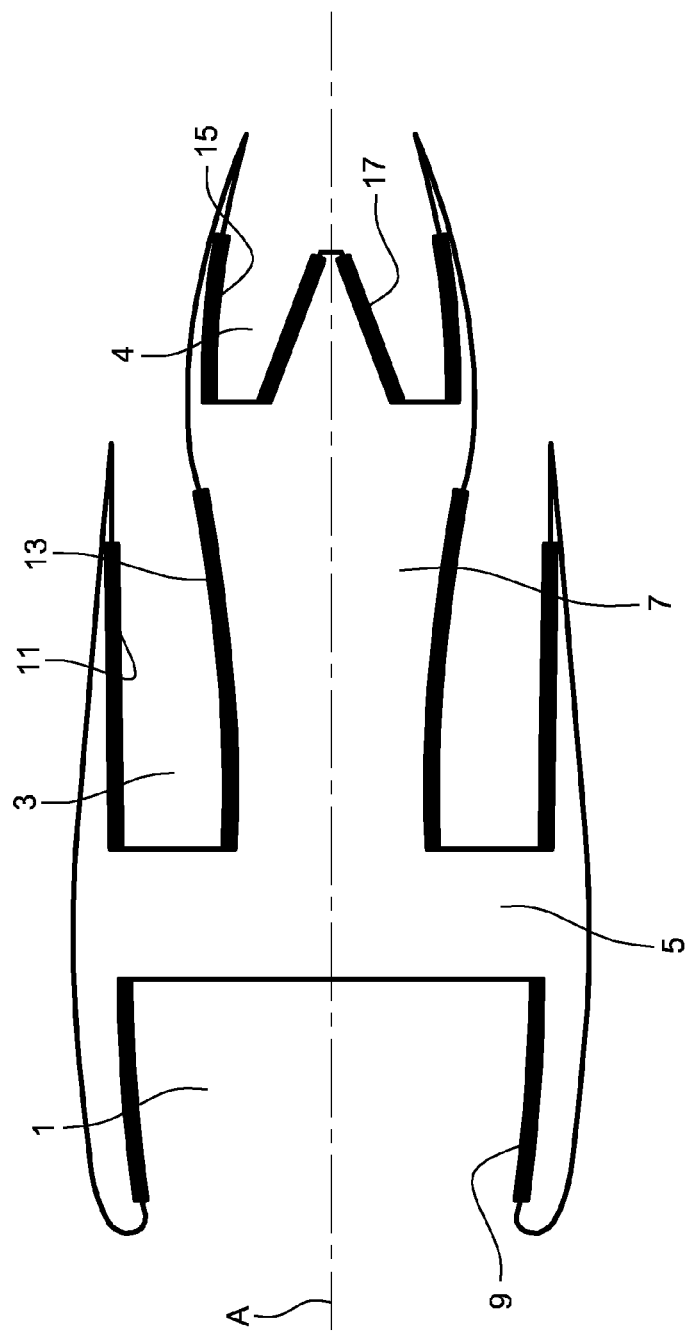
FIG. 1 is a schematic longitudinal sectional view of a nacelle of the prior art, surrounding an aircraft turbojet engine.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Referring now to FIG. 1, in which there is shown a conventional bypass nacelle, defining an air inlet flow path 1, a cold flow path 3 and a hot flow path 4.

Between the air inlet flow path 1 and the cold flow path 3 there is a fan 5, the turbojet engine 7 being, in turn, disposed between the fan 5 and the hot flow path 4.

Conventionally, the air inlet flow path 1 is surrounded by an acoustic absorption shroud 9, formed by the assembly of acoustic attenuation panels.

The cold flow path 3 is, in turn, delimited by radially outer and inner walls, also coated at least partially with acoustic absorption sandwich panels 11 and 13, respectively.

Finally, the hot flow path 4 is delimited by a primary nozzle and a gas ejection cone, coated respectively and at least partially with acoustic absorption sandwich panels 15, 17.

The locations of the acoustic absorption sandwich panels 9, 11, 13, 15, 17 correspond to the walls of the nacelle at which the noise propagates. The presence of these acoustic attenuation panels thus allows substantially reducing the noise level emitted by the propulsion unit of the aircraft, in particular during the take-off or the landing.

Figure 2:
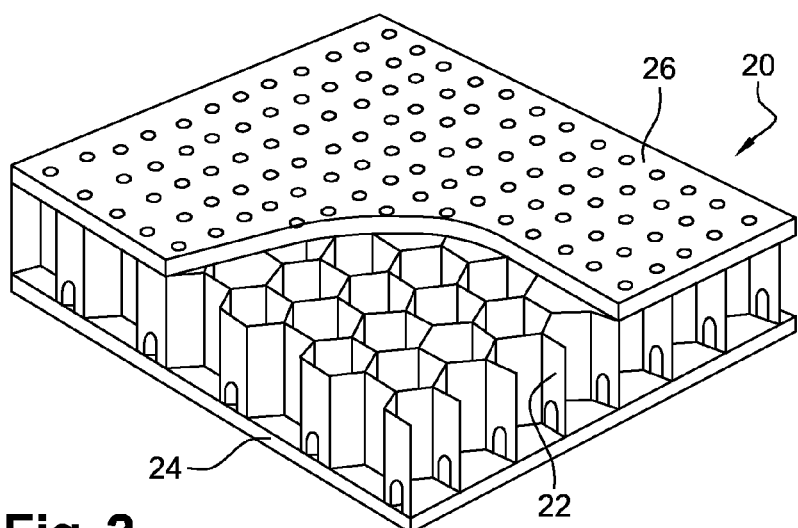
FIG. 2 shows a conventional acoustic attenuation panel according to the prior art.

FIG. 2 shows a conventional acoustic attenuation panel 20, including an alveolar core 22 sandwiched between a solid skin 24, called support skin, and a perforated skin 26, called acoustic skin. The alveolar core includes a plurality of alveoli, in the example of hexagonal section (accordingly forming a structure called a "honeycomb structure"). These alveoli form the acoustic cavities of the acoustic attenuation panel 20. The alveolar core generally consists of metal while the acoustic skin 26 and the support skin 24 are made of a carbon fiber composite material.

Figure 3:
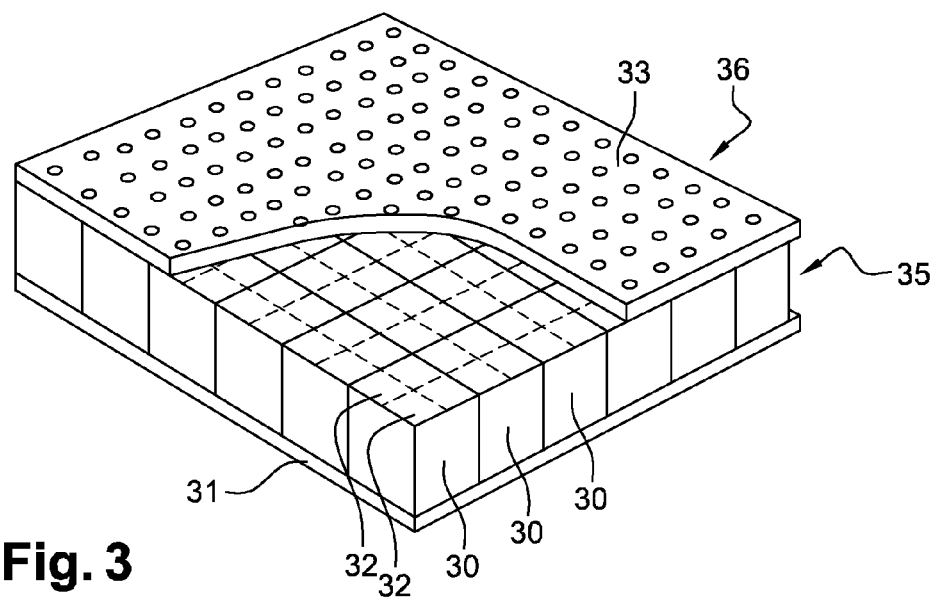
FIG. 3 shows an acoustic attenuation panel in accordance with the teachings of the present disclosure.

FIG. 3 shows an acoustic attenuation panel 36 in accordance with the present disclosure. This panel includes a solid support skin 31 and a perforated acoustic skin 33. Between the support skin 31 and the acoustic skin 36 an alveolar core 35 is disposed. The alveolar core 35 comprises a plurality of adjacent cells 30, each cell 30 including one or more cavities 32 of generally helical shape. In the example of FIG. 3, each cell 30 includes four cavities 32.

FIGS. 4a to 4d show one form of a cell 30 in accordance with the present disclosure.

FIG. 4a shows a cell 30 which gathers a plurality of alveoli (or cavities) 32a, 32b, 32c, 32d, generally helical-shaped. In the shown example, the cell 30 includes a group of four alveoli, whose helical profile winds about a common axis XX, of a direction normal to the skins of the panel 36, in particular the support skin 31 (the perforated skin, called acoustic skin or outer skin is not shown in FIG. 4a). This axis is coincident with the axis of symmetry of the cell 30, which has in the example a square section. The outer walls 30a, 30b, 30c, 30d of the cell 30 extend along a direction parallel to the axis XX. These walls are structuring: they have the mechanical strength desired to absorb the forces undergone by the panel in normal operation, in particular the compression forces.

Each cavity 32a, 32b, 32c, 32d is delimited by the outer walls 30a, 30b, 30c, 30d of the cell 30 and by two of four webs 34a, 34b, 34c, 34d of helical profile. The four webs 34a, 34b, 34c, 34d wind helically about the axis XX and accordingly delimit in pairs the cavities of the cell 30. Thus, the cavity 32a is delimited by the upper wall of the web 34a and by the lower wall of the web; the cavity 32b is delimited by the upper wall of the web 34b and the lower wall of the web 34c, etc. Each of the webs 34a, 34b, 34c, 34d forms a helical ramp. Each web constitutes a helicoid portion of axis XX, the outer edges of the helicoid being truncated by the outer walls 30a, 30b, 30c, 30d of the cell 30. The space between two adjacent webs forms one of the alveoli of the cell 30, this space being further closed by the outer walls of the cell 30.

FIGS. 4b, 4c, and 4d show different sections of the cell 30, as indicated in FIG. 4a.

In accordance with the present disclosure, each cavity 32a, 32b, 32c, 32d has a generally helical shape winding about an axis of a direction normal to the skins of the acoustic attenuation panel. This disposition allows, for the same total thickness of the panel, increasing the effective height of the acoustic cavities. As mentioned above, this allows improving the attenuation capacities in the low frequencies.

Figure 5:
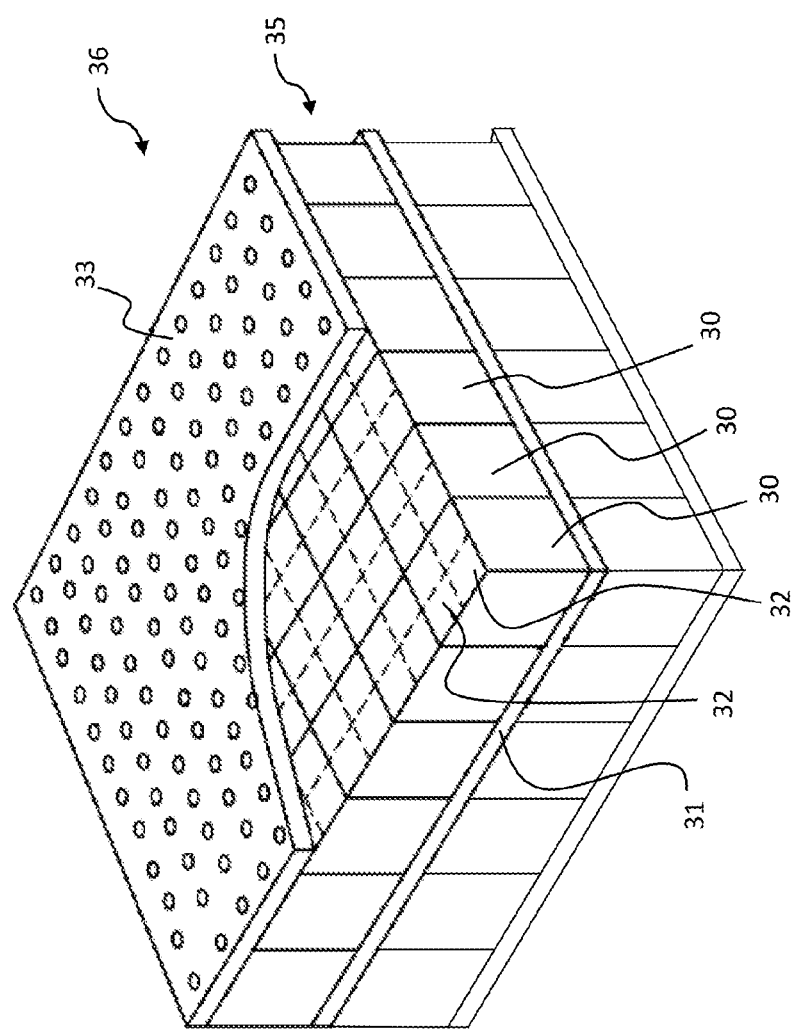
FIG. 5 shows an acoustic attenuation panel with a two-level alveolar core in accordance with the teachings of the present disclosure.

Similar to FIG. 3, FIG. 5 shows an acoustic attenuation panel 36 in accordance with the present disclosure. This panel includes a two-level alveolar core 35 with a solid support skin 31 and a perforated acoustic skin 33. The support skin 31 is between a pair of alveolar cores 35 and between the support skin 31 and the acoustic skin 36 one of the alveolar cores 35 is disposed. The alveolar core 35 comprises a plurality of adjacent cells 30, each cell 30 including one or more cavities 32 of generally helical shape. In the example of FIG. 5, each cell 30 includes four cavities 32.

By gathering several acoustic cavities in a cell retaining vertical outer walls (by considering that the skins of the panel extend along a horizontal direction), the compressive strength of the panel is further improved.

Advantageously, the alveolar core in accordance with the present disclosure can be made by implementing an additive manufacturing method.

Moreover, it is possible to consider producing an acoustic attenuation panel called panel of double degree of freedom (DDOF). Such a panel includes two alveolar cores separated by a porous septum. It is possible in particular to combine a conventional alveolar core, such as the core shown in FIG. 2, with an alveolar core in accordance with the core of FIG. 3.

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. An acoustic attenuation panel for a turbojet engine nacelle comprising:
   at least one alveolar core disposed between at least one inner skin and at least one outer skin,
   wherein the at least one alveolar core includes a plurality of alveoli, each alveolus of the plurality of alveoli defining a helical-shaped cavity winding along an axis in a direction normal to the at least one inner skin and the at least one outer skin.

2. The panel according to claim 1, wherein the at least one alveolar core includes a plurality of cells, each cell including a plurality of alveoli, wherein outer walls of the cells extend along a direction parallel to the axis.

3. The panel according to claim 2, wherein each cell includes four alveoli.

4. The panel according to claim 2, wherein each cell defines a square section.

5. The panel according to claim 2, wherein each cell includes four webs having a helical profile winding along a common axis in a direction normal to the at least one inner skin and the at least one outer skin, wherein the plurality of alveoli is delimited by adjacent web pairs and the outer walls of the plurality of cells.

6. The panel according to claim 5, wherein each web forms a helicoid winding about the common axis, wherein edges of each helicoid are interrupted by the outer walls of the cell.

7. The panel according to claim 1, wherein the at least one alveolar core is a two-level alveolar core, wherein at least one of the levels includes cylindrical-shaped cavities extending along a direction normal to the at least one inner skin and the at least one outer skin.

8. The panel according to claim 1, wherein the at least one outer skin is a perforated skin.

9. The panel according to claim 1, wherein the at least one inner skin is a solid skin.

10. A nacelle for an aircraft turbojet engine comprising at least one acoustic attenuation panel according to claim 1.

* * * * *